Oct. 14, 1941. G. A. LYON 2,259,071
WHEEL STRUCTURE
Filed Nov. 2, 1938 2 Sheets-Sheet 2
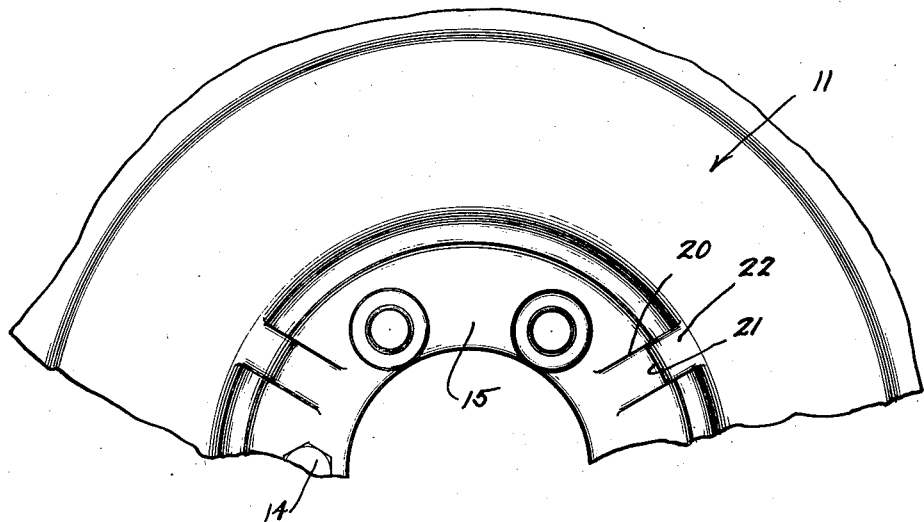
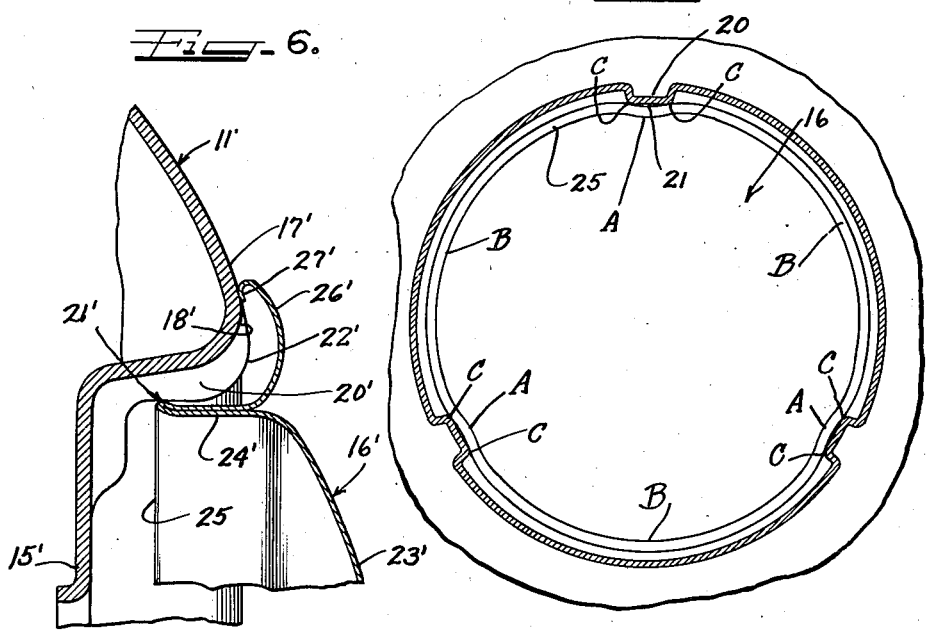
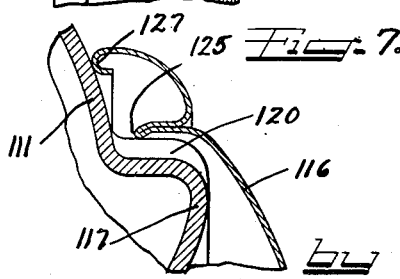
Inventor
GEORGE ALBERT LYON.

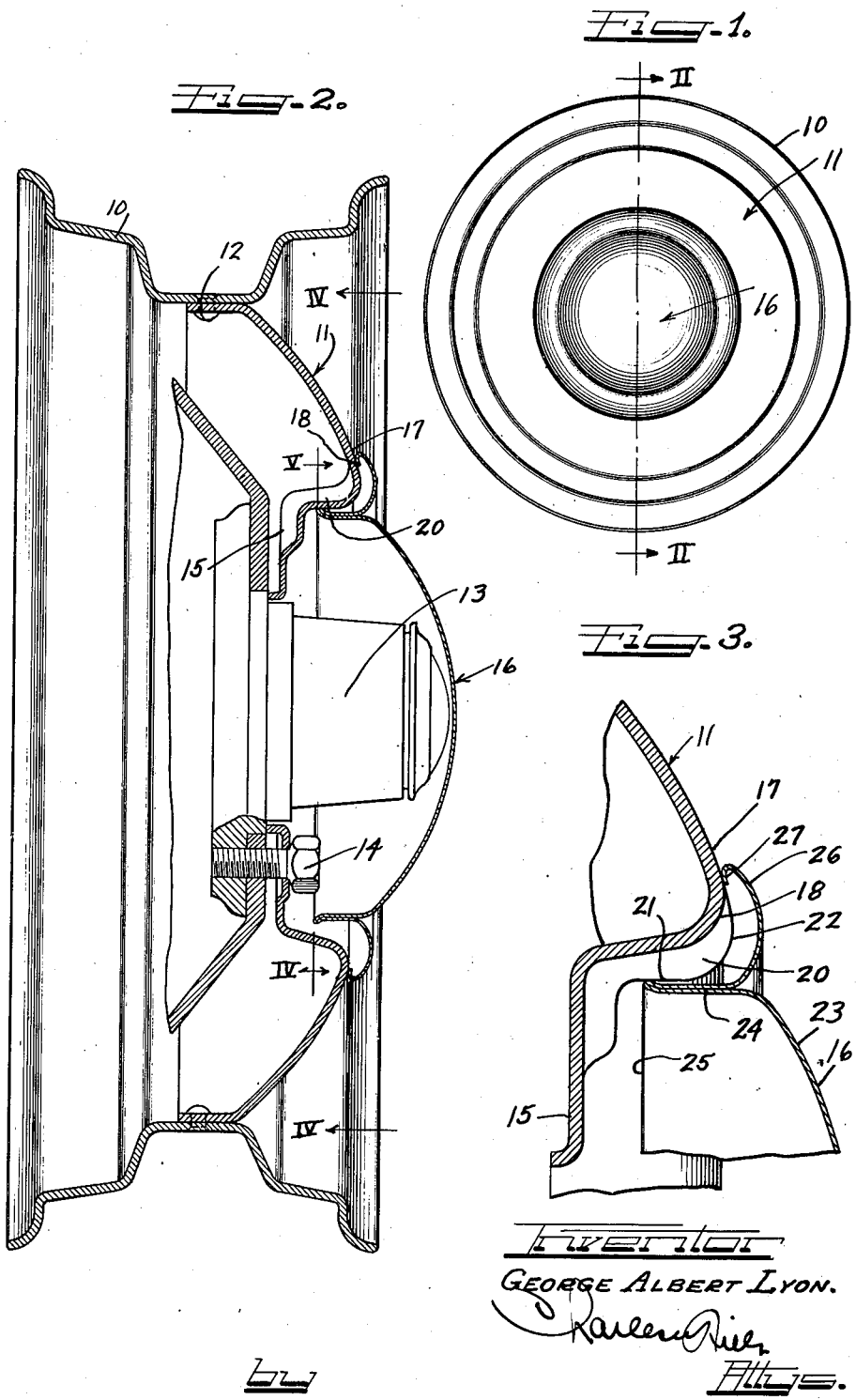

Patented Oct. 14, 1941

2,259,071

UNITED STATES PATENT OFFICE 2,259,071

WHEEL STRUCTURE

George Albert Lyon, Allenhurst, N. J.

Application November 2, 1938, Serial No. 238,300

2 Claims. (Cl. 301—108)

This invention relates to wheels and more particularly to the structure of the wheel body and cover part.

An object of this invention is to provide the central body or shell of a wheel and a cover therefor so interrelated so that the cover may be detachably snapped on the wheel body and retained in position without requiring the use of any separate fastening means, such, for example, as separate springs which are now commonly used on automobile wheels.

A further object of the invention is to provide such a telescoping coaction between a wheel body part and its cover part that the cover part may be detachably snapped into retained engagement on the body part and retained thereon solely by reason of the flexing of a concealed and inner edge of the cover part.

Still another object of this invention is to provide a wheel of the type including a central wheel body part and a cover part therefor, with means for providing a snap-on connection between these parts which utilizes the relatively rigid characteristic of the body part and the flexible characteristic of a portion of the cover part, as well as the axial pressure employed to press the cap on the wheel, whereby sections of the flexible portion of the cover part are stressed and resiliently bowed in opposite directions to frictionally and wedgingly bind the cover part to the wheel part.

A still further object of this invention is to provide a wheel body or spider part with spaced circularly arranged ribs so constructed as to perform a dual function, namely, that of reinforcing the body part and also serving as a means cooperable with a cover part to aid in detachably retaining the cover part thereon.

In accordance with the general features of this invention, there is provided a wheel including a central metallic shell part and a cover part detachably mounted thereon, these parts including telescoping portions with circularly arranged spacing means on one of the portions formed to separate said portions through a substantial part of their respective lengths, with said telescoping portions in contact only at the spacing means, the cover part having its telescoping portion formed into a circular edge of such diameter with respect to the diameter of the exposed surfaces of the spacing means that upon the cover part being pressed in an axial direction onto the shell part alternate portions of said edge are resiliently bowed between the spacing means, and portions of said edge at the spacing means are resiliently bowed in an opposite direction to wedge and detachably retain the cover part pressed in an axial direction onto the shell part. Alternate portions of the edge are resiliently bowed between the spacing means, and the portions of the edge at the spacing means are resiliently bowed in an opposite direction to wedge and detachably retain the cover part on the shell part solely by reason of the resilient bowing of the edge relative to the spacing means.

Still another feature of the invention relates to the provision of the aforesaid spacing means by integral spaced ribs in the shell part so constructed and arranged as to enable the aforesaid flexing and bowing of the edge of the cover part for the purpose of retaining the cover part on the wheel.

Still another feature of the invention relates to the forming of the body or shell part of the wheel with a bulged portion having an annular transversely curved surface for aiding in aligning and guiding the cover part with the portions of the body part adapted to cooperate with the edge of a cover part to effect flexing of the same so as to resiliently and detachably secure the cover part on the wheel.

Another and further feature of the invention relates to the forming of the aforesaid ribs on the body part each with an axially extending slide surface of such width that the edge of the cover part in cooperation therewith will have engagement substantially only with the side edges or margins of said surfaces, thereby enabling the number of contacts to be twice the number of ribs on the wheel body part.

Other objects and features of this invention will more fully appear from the following detailed description taken in connection with the accompanying drawings, in which:

Figure 1 is a side view of a wheel embodying this invention;

Figure 2 is an enlarged cross sectional view taken on the line II—II of Figure 1 looking in the direction indicated by the arrows and showing the wheel applied to an axle in the usual way on an automobile;

Figure 3 is an enlarged fragmentary sectional view illustrating the novel cooperating portions of the wheel body and cover part for detachably retaining the cover part on the wheel;

Figure 4 is a fragmentary side view taken on the line IV—IV of Figure 2, with the cover part removed, showing the construction of the novel ribs in the wheel body part;

Figure 5 is a fragmentary sectional view taken on the line V—V of Figure 2, looking in the direction indicated by the arrows, and showing the manner in which portions of the concealed edge of the cover part are flexed or bowed in opposite directions relative to the ribs on the body part for detachably wedging and binding the cover part to the wheel;

Figure 6 is a fragmentary sectional view similar to Figure 3 showing a slight modification of the invention; and Figure 7 is a fragmentary sectional view similar to Figure 3 showing still a further modification of the invention.

In the drawings:

The reference character 10 designates generally a tire rim which is of the conventional type and is known in the automobile trade as a drop-center type of rim. Secured to this rim 10 so as to be in effect integral therewith is a metallic shell or body part 11 which embodies the features of this invention. This part 11 may be secured to the part 10 by rivets 12, by welding, or by any other suitable means for in effect causing the part 11 to be functionally and operatively integral with the rim.

The body or shell part 11 is sometimes referred to as a "spider" and constitutes the means for mounting the wheel on an axle such as the automobile axle, which is designated generally by the reference character 13 in Figure 2. This securement is effected in the usual way by means of cap screws or bolts 14, which may be of any suitable number, such, for example, as six, and which bolt the central flange portion 15 of the body part 11 to the supporting member or part carried by the axle 13.

The bolts or cap screws 14, as is now commonly the practice in modern automobiles, are concealed by a cover or closure part, which is sometimes termed a "hub cap" and other times referred to as a "wheel disk." Such a cover part is designated generally by the reference character 16 in the accompanying drawings.

It is with the means for detachably retaining the cover part 16 on the wheel body part 11 that my invention is principally concerned. As noted hereinbefore, it is at present the practice to employ separate springs mounted on the wheel body for the purpose of providing a snap-on connection for detachably retaining the cover part on the wheel. My present invention dispenses with such spring and utilizes the inherent resiliency in a portion of the cover part, as well as the rigid characteristic of cooperating portions of the body part to effect the desired snap-on engagement between the parts 11 and 16.

The body part 11 may be made in any suitable or satisfactory manner but is preferably a metallic stamping punched from metallic sheets, such, for example, as steel sheets. As shown in figure, this stamping 11 is provided with a centrally bulged portion 17 having an annular rounded outermost edge adapted to serve to guide the cover part into proper alignment with central ribs 20, which constitute a very important part of the present invention. These ribs, as clearly shown in Figures 3 and 4, are spaced about the axis of the wheel and extend both axially and radially outward from the mounting flange portion 15 of the body part 11. These ribs may be of any suitable or desired number, although I have found that excellent results may be secured with a wheel body part having either three or four of these ribs. These ribs are integral portions of the wheel body part 11. That is to say, they are pressed from the same material which goes to make up the part 11. Also each of these ribs has an axially extending straight slide surface 21 for cooperation with a turned edge 25 of the cover part 16 to be referred to more in detail hereinafter. The ribs 20 are of substantial width, as is evident from Figure 5, and protrude radially inward toward the axis of the wheel.

It will also be perceived from Figure 3 that these ribs extend from the mounting flange portion 15 clear up to the rounded edge 18 of the bulged portion 17 of the body part 11. Moreover, the outer extremities of each of these ribs 20 is curved, as indicated at 22.

Heretofore it has been the practice to rib the central or mounting portion of wheel bodies for the purpose of reinforcing and strengthening the wheel body so that it is better able to resist distorting forces in the operation of the wheel. However, by employing my present invention it is possible to provide a wheel body 11 with reinforcing ribs which not only perform the desired function of strengthening or reinforcing the wheel at the bulged portion of the body part but in addition thereto perform a very important function in the retension of the cover part on the wheel. I shall now proceed to describe in detail the cover part and how it cooperates with these ribs 20 in resiliently and detachably retaining the cover part on the wheel.

The cover part 16 may be made from any suitable metallic material and preferably comprises a metallic stamping. For example, it may be made from any sheet metal, such, for example, as stainless steel. Likewise, it may be suitably ornamented or finished to provide any desired or suitable color effect. Then, too, it may only cover the centermost portion of the body part or it may extend clear to the wheel rim as desired.

The cover part 16 includes an integral rearwardly extending, concealed, double thickness skirt 24 which terminates in the turned edge 25 hereinbefore referred to. Thus, the cover part 16 includes a central crown portion 23, a depending skirt portion 24, and a marginal portion 26 terminating in a turned edge 27 for abutting the bulged portion 17 of the body part. The depending portion or skirt 24 of the cover part or wheel disk may be formed in any suitable manner, but I preferably form it in the manner disclosed in my copending patent application Serial No. 211,781, filed June 4, 1938.

The turned edge 25 of the cover part 16 is turned outwardly and is adapted to slide over the flat axially extending surfaces 21 of the three spaced ribs 20 and frictionally cooperates with these ribs in such a manner as to detachably and resiliently retain the cover part in position on the wheel.

In Figure 5 I have illustrated, on a somewhat exaggerated scale, the character of the flexing that occurs in the turned edge 25 when the cover part is pressed axially into retaining cooperation with the ribs or spacing means 20. It will be evident that upon the initial engagement of the turned edge 25 with the ribs 20, the rounded ends 22 of the ribs will serve to guide the turned edge into register with the axially extending slide surfaces 21' of the ribs. Thereafter continued inward movement of the turned edge 25 within the ribs results in the flexing or bowing of the turned edge in the manner illustrated in Figure 5. That is to say, the portions of the turned edge, which in this case are three in number, in engagement with the slide surfaces 21 of the ribs, are caused to be bowed radially inward toward the axis of the wheel, whereas the intermediate portions of the turned edge, or in other words those portions between the ribs, are caused to be flexed or bowed outwardly away from the axis of the wheel. I have designated the first set of portions by the reference character A and the second set of oppositely deflected portions by the reference character B, in Figure 5.

It will be perceived that the portions A of the turned edge 25 do not have a flush contact with the flat slide surfaces 21 of the three ribs. I have observed that by the reason of the rib being of considerable width, the portion A is bowed over the flat surface 21 so that there is in reality a slight spacing between the center line of the surface 21 and the portion A. This results in the portion A gripping the edges of the rib at two spaced points, as designated at C—C in Figure 5. Thus, with three ribs the turned edge 25 has in reality six points of contact.

This arrangement enables a tight wedging of the turned edge 25 of the cover part 16 against the ribs and against the resiliency of the turned edge tending to return the distorted edge to its normal or true circular form. The wedged engagement, however, is not of such character that the cover part cannot be readily pried loose from retained position on the wheel body part. As a matter of fact, I have observed that this cap of my invention may be quickly pressed by manual pressure in an axial direction into tight retained engagement with the body part and may likewise be easily pried loose upon the insertion of a suitable tool under the turned outer edge 27 of the cover part. The wedged engagement, however, is of such a binding character that the cover part will be properly retained on the wheel during the normal and intended operation of the wheel over the roadway.

From the foregoing it will be perceived that I have provided a novel snap-on connection between the cover and wheel body part which is concealed by the marginal portion 26 of the cover part. This portion 26, as noted before, may have its outer edge 27 arranged to abut the bulged portion 17 of the body part and to this limit inward movement of the cover part with respect to the body part. In other words, this edge 27 serves to limit the telescoping coaction of the wheel body and cover part. The portion 26 also serves to conceal the outermost extremities of the spaced ribs 20.

In Figure 6 I have illustrated a modification of the invention wherein I have employed the same numerals as are used in Figure 3 to designate corresponding parts, with the exception that the numerals are prime. In such form of the invention the wheel body part 11' includes the bulged portion 17', the rounded nose 18', ribs 20' and a mounting flange 15'. The ribs 20' have their outer extremities rounded at 22', which extremities are concealed by the marginal portion 26' of the cover part 16'. The marginal portion 26' of the cover part has a turned outer edge 27' adapted to bear against the bulged portion 17' of the wheel body part. The central or bulged portion 23' of the cover part 16' terminates in a concealed double thickness skirt or flange 24' which connects the two portions 23' and 26' of the body part. The inner extremity of this skirt 24' is formed into a turned flange 25' for cooperation with the rib 20'.

The principal difference between this form of the invention and the one previously described resides in the fact that the axially extending flat surfaces of the ribs 20 are formed with a slight taper, as indicated at 21', whereas slide surfaces 21 are not tapered. This taper is in a radially outward direction and is very slight, as is evident from Figure 6.

It is so desired, this feature of tapering or inclining the exposed surfaces of the ribs may be employed for the purpose of enhancing the character of the engagement between the turned edge 25' and the ribs. By using this feature, I in effect provide the ribs with humps over which the turned edge must ride. Otherwise the action of this modified structure is substantially the same as that involved in the first described form.

In the modification shown in Figure 7, the ribs 120 are provided on an outer side of the bulged portion 117 of the wheel body part 111 so that they face radially outward instead of radially inward, as in the previously described two forms of the invention. The bulged portion 117 of this body part 111 may be curved inwardly into a flange (not shown) which may be like the flange 15—15' of the other forms.

The cover part 116 cooperates with the body part 111 and has an inwardly turned edge 125 for embracing the flat surfaces of the ribs 120. Also, the outer extremity of the cover part 116 may be formed into a turned edge 127 for engaging the wheel body part 111 to limit inward movement of the cover part relative to the wheel.

The action involved in this modification of the invention is very similar to that of the other forms. It will be perceived that the cap 116 is retained on the body part 111 by reason of the wedging action between the turned edge 125 and the spaced ribs 120.

I claim as my invention:

1. In combination, a wheel including a central metallic shell part and a cover part detachably mounted thereon, said parts including telescoping portions with circularly arranged spacing means on one of said portions formed to separate said portions through a substantial part of their respective lengths with said telescoping portions in contact only at said spacing means, said cover part having its telescoping portion formed into a circular edge engageable with the exposed surfaces of the spacing means that upon said cover part being pressed in an axial direction onto said shell part alternate portions of said edge are resiliently bowed between the spacing means and the other portions of said edge of the spacing means are resiliently bowed in an opposite direction whereby to wedge and detachably retain said cover part on said shell part solely by reason of said resilient bowing of said edge between said spacing means, said circular edge extending rearwardly and being slightly turned radially outwardly into a double thickness of metal to resist permanent indentation.

2. In combination, a wheel including a central metallic shell part and a cover part detachably mounted thereon, said parts including telescoping portions with circularly arranged spacing means on one of said portions formed to separate said portions through a substantial part of their respective lengths with said telescoping portions in contact only at said spacing means, said cover part having its telescoping portion formed into a circular edge of such diameter with respect to the diameter of the exposed surfaces of the spacing means that upon said cover part being pressed in an axial direction onto said shell part said edge will fit inside said shell part and alternate portions of said edge are resiliently bowed between the spacing means and the other portions of said edge of the spacing means are resiliently bowed in an opposite direction to wedge and detachably retain said cover part on said shell part solely by reason of said resilient bowing of said edge between said spacing means, said circular edge extending rearwardly and being slightly turned radially outwardly.

GEORGE ALBERT LYON.